No. 733,220. PATENTED JULY 7, 1903.
A. KREBS.
VALVE GEAR FOR EXPLOSIVE ENGINES.
APPLICATION FILED DEC. 11, 1902.
NO MODEL. 2 SHEETS—SHEET 1.

WITNESSES:
Fred White
Thomas H. Wallace

INVENTOR:
Arthur Krebs,
By his Attorneys
Arthur C. Fraser & Co

No. 733,220. PATENTED JULY 7, 1903.
A. KREBS.
VALVE GEAR FOR EXPLOSIVE ENGINES.
APPLICATION FILED DEC. 11, 1902.
NO MODEL. 2 SHEETS—SHEET 2.
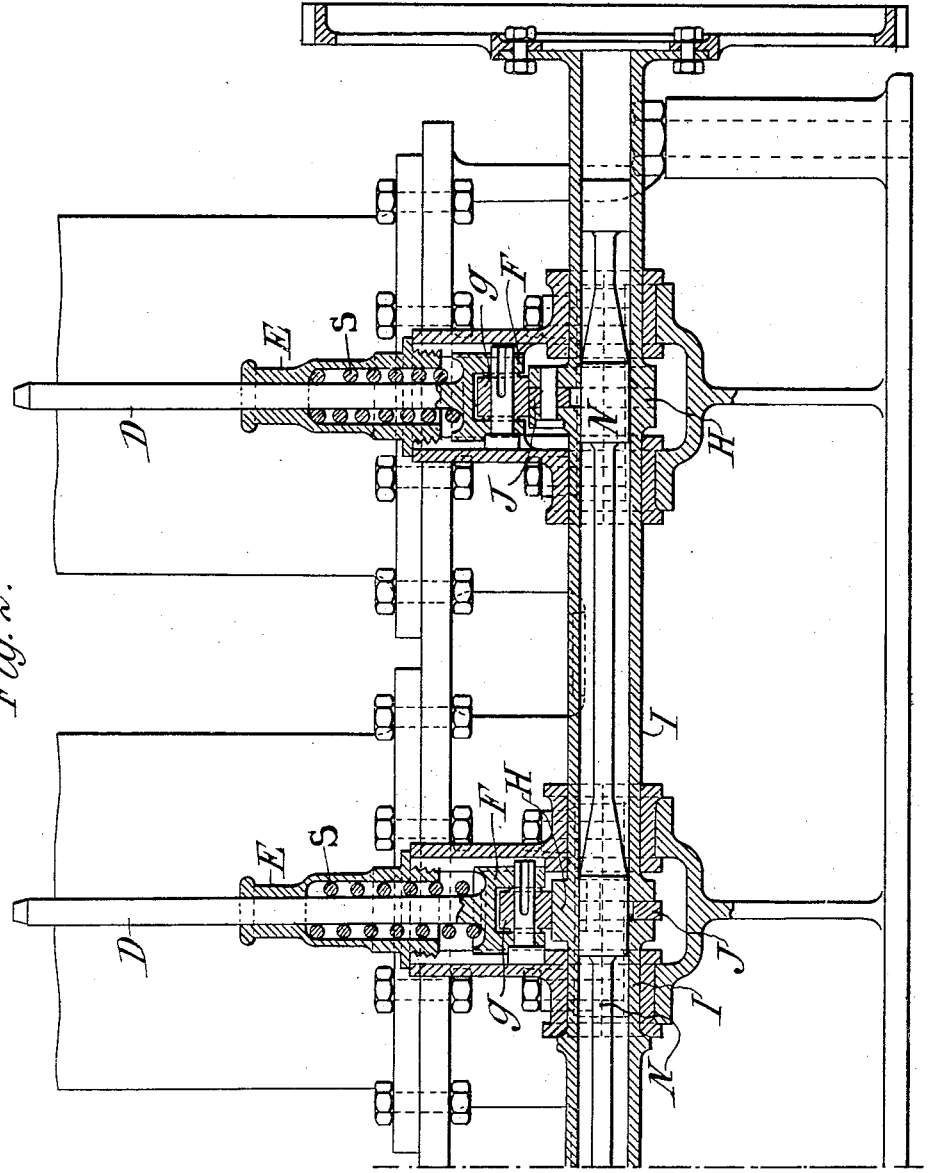
WITNESSES:
Fred White
Thomas J Wallace
INVENTOR:
Arthur Krebs,
By his Attorneys:
Arthur C. Fraser & Co No. 733,220. Patented July 7, 1903.

UNITED STATES PATENT OFFICE.

ARTHUR KREBS, OF PARIS, FRANCE, ASSIGNOR TO STE. AME DES ANCIENS ÉTABLISSEMENTS PANHARD ET LEVASSOR, OF PARIS, FRANCE.

VALVE-GEAR FOR EXPLOSIVE-ENGINES.

SPECIFICATION forming part of Letters Patent No. 733,220, dated July 7, 1903.

Application filed December 11, 1902. Serial No. 134,876. (No model.)

*To all whom it may concern:*

Be it known that I, ARTHUR KREBS, a citizen of the Republic of France, and a resident of Paris, France, have invented certain new and useful Improvements in Valve-Gear for Explosive-Engines, of which the following is a specification.

In explosion-motors the inlet-valves are operated automatically by the fall in pressure produced by the piston in making its suction-stroke, or they are opened and closed mechanically by the operation of the motor. The opening of the valve takes place usually at the moment that the piston begins its suction-stroke, and the closing of the said valve takes place usually at the moment when the said stroke is completed.

The present invention has for its object to enable the moment of the closing of the inlet or suction valve to be varied at will, the motor being at rest or in operation, which I will describe, referring to the accompanying drawings, in which—

Figure 1:
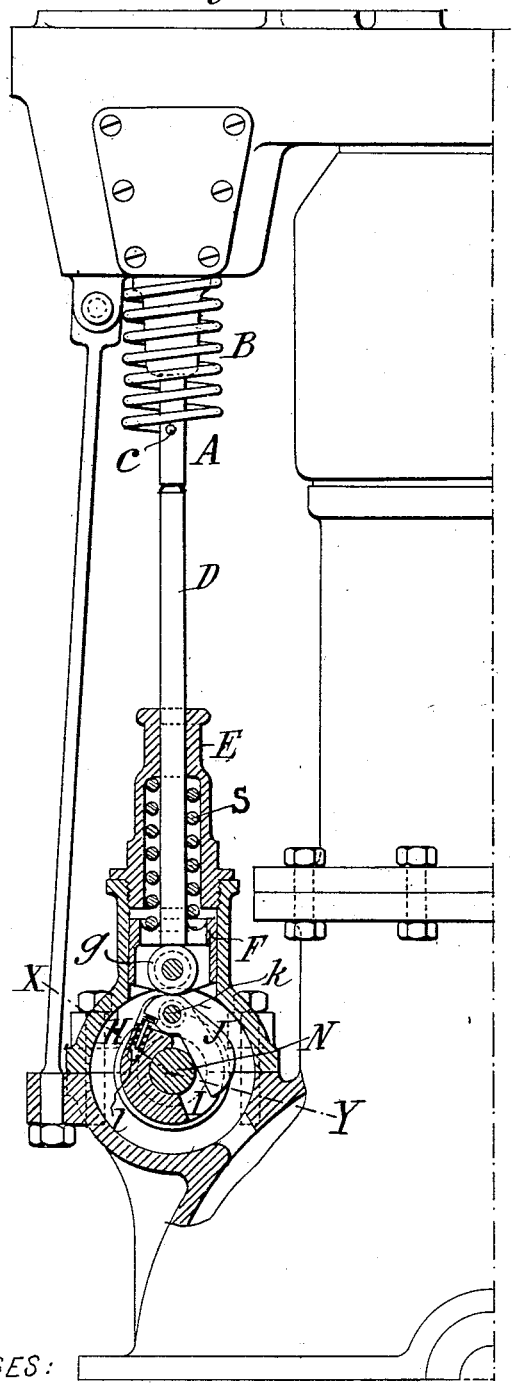

Figure 1 is a vertical section, partly in elevation; Fig. 2, a longitudinal section; and Figs. 3 to 6, sections of the cam to an enlarged scale, showing different positions of the movable cam.

The inlet-valve, which is of the ordinary form, is terminated by a rod A and is kept normally in its closed position by a spring B, fixed to the valve-rod at c. In order to open the valve, the rod A is forced inward by a rod D, independent of the rod A, and actuated by a cam H, mounted on a hollow counter-shaft I. This rod is guided at E and F by means of a slide-block and is provided at its end with a roller g, which bears on the cam H. The rod D is kept in contact with the cam by means of the spring S. This cam H comprises a movable part, which can be caused to turn on a pivot, so as to move it away more or less. This movable part J may be arranged in various ways relatively to the cam H. The arrangement which I have shown and which I prefer consists in forming in the cam H in the center of its width a slot at right angles to the axis of the shaft I and a corresponding slot in the hollow shaft. In this slot is fitted the movable cam J, which is mounted on the pivot k. A spring l, contained in a recess of the cam H, bears against the heel-piece m of the movable cam J and forces the latter to move back into the slot in such a manner as not to project from the cam H, except when it is caused to do so by the means which I shall now proceed to describe.

Figure 3:
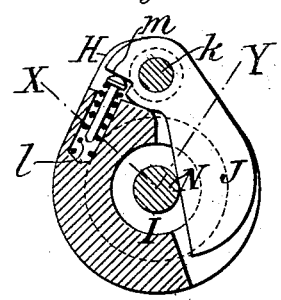
Figure 4:
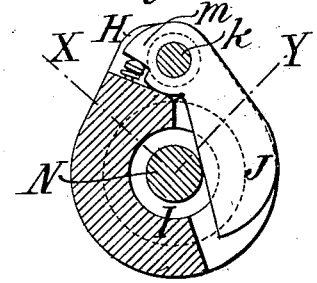
Figure 5:
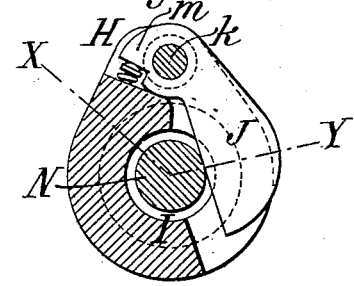
Figure 6:
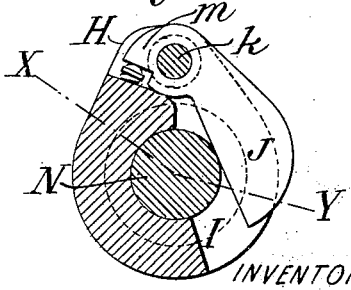

Through the hollow shaft I there extends a rod N, which has two parts of different diameters connected together by a conical portion. When this rod N is moved in the longitudinal direction, its conical portion gradually raises the movable cam J, so that it projects more or less beyond the surface of the cam H, thereby causing the position of closure of the inlet-valve to be shifted farther and farther back. In Fig. 3 the movable cam is shown completely moved inward. The radial line X indicates the position of opening, while the line Y indicates the position of closing. The same letters indicate these positions in Figs. 4, 5, 6, and 1, which represent intermediate positions of the movable cam J and its extreme positions, Figs. 6 and 1.

It will be noted that the same rod N can be made to act upon several movable cams, the said cams corresponding to the various cylinders of the motor.

Having thus described the nature of this invention and the best means I know of carrying the same into practical effect, I claim—

1. The combination of a valve, a rotating cam having a movable part pivoted thereto adapted to operate said valve, and capable of being projected outward from the body of the cam to varying extents, a longitudinally-sliding rod having an inclined surface adapted to engage said movable part to vary its degree of projection in accordance with the movements of the rod, whereby said valve is given varying movements.

2. In explosion-motors, the combination of an inlet-valve, a rod for actuating it, a cam having a movable part adapted to operate the rod, and capable of being projected outward therefrom to varying extents, and a longitudinally-movable rod having an inclined face adapted to engage said movable part, and to vary its degree of projection, whereby said valve is given varying movements from its seat.

3. The combination of a valve, a cam having a movable part for actuating it, a hollow shaft carrying said cam, a rod having an inclined face movable through the bore of said shaft, and adapted to engage said movable part to vary its degree of projection from said shaft.

4. The combination of a valve, a cam having a movable part for actuating it, and adapted to be projected outward therefrom to varying extents, a spring tending to hold said movable part in its inward position, a hollow shaft carrying said cam, and a movable rod having a conical portion adapted to move longitudinally in the bore of said shaft, and thereby to project said movable part to a greater or less degree from said shaft.

In witness whereof I have hereunto signed my name in the presence of two subscribing witnesses.

ARTHUR KREBS.

Witnesses:
MARIEL ARMENGAUD,
EDWARD P. MACLEAN.